US006242096B1

(12) United States Patent
Wolter et al.

(10) Patent No.: US 6,242,096 B1
(45) Date of Patent: Jun. 5, 2001

(54) ENAMELLED METALLIC WIRES

(75) Inventors: Herbert Wolter, Grossrinderfeld; Werner Storch, Hochberg; Karl Deichmann, Würzburg, all of (DE)

(73) Assignee: Fraunhofer Gesellschaftzur Forderung der Angewandten Forschüng E.V., Munich (DE)

( * ) Notice: Subject to any disclaimer, the term of this patent is extended or adjusted under 35 U.S.C. 154(b) by 0 days.

(21) Appl. No.: 09/117,565
(22) PCT Filed: Nov. 28, 1997
(86) PCT No.: PCT/DE97/02781
  § 371 Date: Jul. 28, 1998
  § 102(e) Date: Jul. 28, 1998
(87) PCT Pub. No.: WO98/25277
  PCT Pub. Date: Jun. 11, 1998

(30) Foreign Application Priority Data

Dec. 4, 1996 (DE) .............................. 196 50 288

(51) Int. Cl.[7] ...................................................... C07F 7/08
(52) U.S. Cl. ......................... 428/377; 428/357; 428/361; 428/387; 556/438; 556/420
(58) Field of Search ...................................... 428/357, 361, 428/377, 387; 556/438, 420

(56) References Cited

U.S. PATENT DOCUMENTS

| 5,399,738 | 3/1995 | Wolter et al. . |
| 5,532,398 | 7/1996 | Wolter et al. . |
| 5,917,075 | 6/1999 | Wolter . |
| 6,124,491 | 9/2000 | Wolter et al. . |

*Primary Examiner*—Richard Weisberger
(74) *Attorney, Agent, or Firm*—Brinks Hofer Gilson & Lione

(57) ABSTRACT

The invention relates to varnished metal wires with one or more electrically insulating varnish coatings, at least one of the electrically insulating varnish coatings representing an organically modified silicic acid (hetero) polycondensate, which has been obtained by partial or total hydrolytic condensation of one or more hydrolytically condensable compounds of silicon and if necessary other elements from the group B, Al, P, Sn, Pb, the transition metals, the lanthanides and actinides, and/or from precondensates derived from the abovenamed compounds, if necessary in the presence of a catalyst and/or of a solvent by the action of water and moisture.

20 Claims, No Drawings

ENAMELLED METALLIC WIRES

The invention relates to varnished metal wires upon which there are applied one or more electrically insulated varnish coatings. Such varnish-insulated wires, which in particular consist of copper, have been used for a long time for the manufacture of windings of electrical motors and other coils. The applied varnish coating in this case, in addition to providing protection against mechanical influences, is also intended to have an insulating effect. The varnish layer, or a plurality of varnish layers to be applied one above the other, are applied with applicator systems specially developed for this purpose, the solvent contained in the varnish being removed by a thermal treatment. In this thermal treatment at the same time the organic resins are hardened by polycondensation. The polymer systems used until now on a polyimide or polyamide basis are however not always suitable to resist the mechanical stresses occurring, such in particular as occur during winding of coils or other elements.

Improved scratch resistance and adhesion and a greater resistance to scraping stress and thus higher abrasion resistance are required.

The coated metal wires must also however be sufficiently flexible with the coating applied, and the coating must not crack during bending and the corresponding partial stretching along the bending radius. A high partial discharge stability is also an important criterion.

Moreover, the applied varnish layers or plurality of varnish layers applied one above the other must also have the desired properties even at relatively high temperatures, and no harmful materials must be given off during heating.

In order to reduce costs during the manufacture of such varnished metal wires, high hardening speeds must be achieved in order to shorten the necessary coating and in order to keep small the necessary outlay on space for the coating systems. From the environmental point of view it is also necessary to use coating materials which contain no solvents or non-toxic and non-aggressive solvents.

It is therefore the object of the invention to provide varnished metal wires with one or a plurality of electrically insulating varnish coatings, ensuring a high hardening speed with simultaneous improvement in the mechanical, thermal and electrical properties of the applied varnish coatings.

In contrast to those previously used, the electrically insulating varnish layers applied according to the invention contain no critical solvents, such as xylols, cresols, NMP or others, so that during coating and during hardening there are no further requirements as regards an expensive evacuation system and filtering of the evacuated gases. As in the case of the varnish layers applied, as a rule the organically polymerisable groups are compounded with the inorganic polymer structure, no toxicologically problematic monomers such for example as acrylate monomers, occur.

The coating may be extremely flexible in structure by means of various methods; they may be applied for example by extrusion with high productivity and the smallest losses. In one coating step, considerably larger coating thicknesses can be applied than is possible with previous methods and wire varnishes previously used. Thus, in one coating procedure, a coating thickness can be applied which previously was only achieved with ten successively applied coats. The coating thickness should be in a range between 2 and 100 μm and preferably between 5 and 30 μm.

The most varied methods and energies may be used for hardening; thus hardening may be carried out for example with UV, IR, normal light or thermal procedures, or with the combination of a plurality of energy forms. As the hardening speeds of the IR or photo-induced hardening lie considerably above the thermal ones, the corresponding varnish systems are preferred. In this way in all there results a higher application speed.

A further advantage is the great variability in the composition of the varnish layer, which can be co-ordinated to the most varied mechanical requirements and correspondingly optimised. Thus, for the most varied cases of application, the abrasion resistance, scratch resistance, hardness, flexibility, tensile strength, adhesion and expansion capacity can be correspondingly optimised for all or special properties.

A further advantage arises from the achievement of a relatively high overall cross linking density, which ensures high tan δ-transition temperatures and the inorganic molecule portion ensures a high partial discharge stability, such as for example are necessary with electric motors.

The electrical properties are also favourable, as high disruptive strengths and high volume resistances can be achieved with the applied varnish layers.

The varnished metal wires according to the invention are considerably improved in their properties compared to the previously-used varnish layers, as in particular normally mutually exclusive requirements, such for example as high scratch resistance (scraping resistance) and a high tensile strength or expansion capacity cannot normally be optimally taken into account within wide temperature ranges.

In addition, one or more layers of other materials or mixtures of materials can be applied.

The coating may be applied to the most varied metal, such as copper, gold, silver, aluminum, tin, zinc or iron or alloys.

The varnished metal wire according to the invention will be coated with a varnish which has been obtained by partial or total hydrolytic condensation of one or a plurality of hydrolytically condensable compounds of silicon and if necessary other elements from the group B, Al, P, Sn, Pb, the transitional metals, the lanthanides and the actinides, and/or from the precondensates derived from the abovenamed compounds, if necessary in the presence of a catalyst and/or of a solvent by the action of water or moisture. This varnish can be applied to metal wires, which if necessary already have one or more electrically insulating varnish coats, and can if necessary be subsequently dried and hardened.

It is advantageous to apply at least two varnish layers, which represent an organically modified silicic acid (hetero) polycondensate.

The organically modified silicic acid (hetero) polycondensate to be used according to the invention can contain one or more hydrolytically (pre)-condensed compounds of silicon, which are derived from various monomers. These coating materials are known under the name ORMOCERs. Express reference is made here to the disclosed content of U.S. Pat. No. 5,399,738; 5,532,398; 5917,075; and 6,124, 491.

Examples of such monomers, which are derivable from general formulae, are:

I.

(I)

The residues and indices being identical or different, and having the following meaning:

A = O, S, PR", POR", NHC(O)O or NHC(O)NR",
B = a straight-chained or branched organic residue,
   derived from a compound BI with at least one (for
   c = 1 und A = NHC(O)O or NHC(O)NR") or atleast
   two C = C-double bonds and 5 to 50 carbon atoms,
R = alkyl, alkenyl, aryl, alkylaryl or
   arylalkyl,
R' = alkylene, arylene or alkylenarylene,
R" = hydrogen, alkyl or aryl,
X = hydrogen, halogen, hydroxy, alkoxy, acyloxy,
   alkylcarbonyl, alkoxycarbonyl or NR"$_2$,
a = 1, 2 or 3,
b = 0, 1 or 2,
c = 0 or 1,
x = a whole number, whose maximum value corresponds
   to the number of double bonds in the compound B'
   minus 1, or is equal to the number of double
   bonds in the compound B', if c = 1 and A stands
   for NHC(O)O or NHC(O)NR", the alkyl or alkenyl residues if necessary being substituted straight-chained, branched or cyclic residues with 1 to 20 carbon atoms and being capable of containing oxygen and/or sulphur atoms and/or amino groups, aryl stands for if necessary substituted phenyl, naphthyl or biphenyl, and the above alkoxy-, acyloxy-, alkylcarbonyl-, alkoxycarbonyl-, alkylaryl-, arylalkyl-, arylene-, alkylene and alkylenearyl residues are derived from the above-defined alkyl- and aryl residues.

An advantageous feature in a varnish system based on these silanes is that in this way there is a possibility of bonding to inorganic surfaces (e.g. Cu). The hardening can be influenced by the variability in the number of reactive double bonds.

II.

$$B\left[A-(Z)_d-\underset{\underset{R^2}{|}}{R^1}-R'-SiX_aR_b\right]_c \quad (II)$$

here the residues and indices being identical or different, and have the following meaning:

B = a straight-chained or branched organic residue with at
   least one C = C-double bond and 4 to 50 carbon atoms;
X = hydrogen, halogen, hydroxy, alkoxy, acyloxy,
   alkylcarbonyl, alkoxycarbonyl or NR"$_2$;
R = alkyl, alkenyl, aryl, alkylaryl or arylalkyl;
R' = alkylene, arylene, arylenealkylene or alkylenearylene
   with respectively 0 to 10 carbon atoms, these residues
   being capable of containing oxygen and/or sulphur
   atoms and/or amino groups;
R" = hydrogen, alkyl or aryl;
A = O, S or NH for
   d = 1 and
   Z = CO and
   R$^1$ = if necessary alkylene, arylene oder al-
      kylenearylene containing oxygen- and/or
      sulphur atoms and/or amino-groups, with 1 to
      10 carbon atoms respectively, and
   R$^2$ = H or COOH; or
A = O, S, NH or COO for
   d = 0 or 1 and
   Z = CHR, with R = H, alkyl, aryl or alky-
      laryl, and
   R$^1$ = alkylene, arylene or alkylenearylene if
      necessary interrupted by oxygen or sulphur atoms, with 1 to 10 carbon atoms
respectively, and
R$^2$ = OH; or
A = S for
d = 1 and
Z = CO and
R$^1$ = N and
R$^2$ = H;
a = 1, 2 or 3;
b = 0, 1 or 2, with a + b = 3;
c = 1, 2, 3 or 4.

An advantage in this case of R$^2$=CO$_2$H, that for example a complexing of metal atoms of the wire surface can be achieved. In this way an extremely stable bond results.

III.

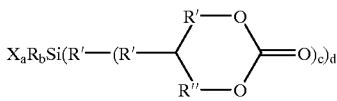

III

In this case the residues and indices can be identical or different and have the following meaning:

X = hydrogen, halogen, hydroxy, alkoxy,
   acyloxy, alkylcarbonyl, alkoxycarbonyl or NR$^2$$_2$;
R = alkyl, alkenyl, aryl, alkylaryl or arylalkyl;
R' = alkylene, arylene, arylenealkylene or alkyle-
   nearylene with respectively 0 to 10 carbon
   atoms, these residues being capable of
   containing oxygen- and/or sulphur atoms and/or
   amino groups;
R" = alkylene, arylene, arylenealkylene or
   alkylenearylene with respectively 1 to 10 carbon
   atoms, these residues being capable of containing
   oxygen and/or sulphur atoms and/or amino groups;
R$^2$ = hydrogen, alkyl or aryl;
a = 1, 2 oder 3;
b = 0, 1 or 2, with a + b = 1, 2 or 3;
c = 1, 2, 3, 4, 5 or 6;
d = 4 − a − b.

An advantage in this system is that the R$^{1(11)}$—O group can react upon ring opening, e.g. with amino groups, so that likewise a stable bond results.

The invention will be explained in the following with reference to further examples.

I EXAMPLES OF THE USE OF VARIOUS ORMOCER SYSTEMS AS TOP COAT

There were used copper wire with a Teic-polyesterimide basic layer (coating thickness=30 μm). The following varnish systems quoted were applied as a cover varnish (top coat) and were thermally hardened. At 600° C., in dependence on the furnace length, wire speeds of well above 25 m/min are possible. There result coatings with excellent surface quality. Condensation water stability (14 days at 40° C. and 100% relative air humidity) is also provided, as is a high resistance to thermal shock (freedom from cracks after 10 to 30 s, 300° C.). An extremely good bond to the Teic-polyesterimide basic coating, i.e. extremely good adhesion is observed (in REM photographs no phase boundary layer is visible any longer). Further detailed data are quoted in the individual examples.

In the examples the following abbreviations are used:

SR-368=tris-(2-hydroxyethyl) isocyanuratetriacrylate
MPMDM=3-mercaptopropylmethyldimethoxysilane
TEOS=tetraethoxysilane
TMPTA=trimenthypropanetriacrylate
MMDO=mercaptopropylmethyldimethoxysilane
DDDM=dodecanediolmethacrylate Example 1

SR-368: MPMDM=1:1

54.0 g (0.3 mol) of 3-mercaptopropylmethyldimethoxysilane are dripped into the receiver of 127 g (0.3 mol) tris-(2-hydroxyethyl) isocyanuratetriacrylate, dissolved in 300 ml ethyl acetate. With cooling, 19 g of an ethanolic KOH solution is slowly dripped in. After about 5 minutes the reaction (thiol addition to an acrylate double bond) is terminated. 8.6 g of 0.5 n HCL is dripped in to hydrolyse and condense the methoxy groups. After stirring at ambient temperature for about 1 day, the mixture is processed. The resultant varnish can be used, directly or after modification of the solvent content or composition, to adjust the rheology for wire coating. The following properties result on a Cu wire with a diameter= 0.95 mm:

coating thickness: about 11 μm tan δ-glass transition temperature (DIN) about 202° C.

1×D–winding curl=crack-free windable

Example 2

SR-368: MPMDM:TEOS=1:1:0.2

14.4 g (0.08 mol) of mercaptopropylmethyldimethoxysilane are dripped into the receiver of 33.8 g (0.08 mol) tris-(2-hydroxyethyl) isocyanuratetriacrylate, dissolved in 80 ml ethyl acetate. With cooling, 5.1 g of an ethanolic KOH solution is slowly dripped in. After about 5 minutes the reaction (thiol addition to an acrylate double bond) is terminated. 2.3 g of 0.5 n HCL is dripped in to hydrolyse and condense the methoxy groups. After stirring at ambient temperature for about 5 hours, 3.33 g (0.016 mol) of tetraethoxysilane and 0.92 g of 0.12 n HCL are added. After further stirring at ambient temperature for about 1 day, the mixture is processed. The resultant varnish can be used, directly or after modification of the solvent content or composition, to adjust the rheology for wire coating. The following properties result on a Cu wire with a diameter= 0.95 mm:

coating thickness: about 19 μm

1×D–winding curl=crack-free windable

Example 3

SR-368: MPMDM:TEOS=1:1:0.4

27.0 g (0.15 mol) of mercaptopropylmethyldimethoxysilane are dripped into the receiver of 63.50 g (0.15 mol) tris-(2-hydroxyethyl) isocyanuratetriacrylate, dissolved in 150 ml ethyl acetate. With cooling, 9.7 g of an ethanolic KOH solution is slowly dripped in. After about 5 minutes the reaction (thiol addition to an acrylate double bond) is terminated. 4.4 g of 0.5 n HCL is dripped in to hydrolyse and condense the methoxy groups. After stirring at ambient temperature for about 5 hours, 12.5g (0.06 mol) of tetraethoxysilane and 3.5 g of 0.12 n HCL are added. After further stirring at ambient temperature for about 1 day, the mixture is processed. The resultant varnish can be used, directly or after modification of the solvent content or composition, to adjust the rheology for wire coating. The following properties result on a Cu wire with a diameter= 0.95 mm or 0.32 mm:

coating thickness: about 15 μm

1×D–winding curl=crack-free windable

Example 4

TMPTA: MPMDM =1:1

45 g (0.25 mol) of 3-mercaptopropylmethyldimethoxysilane are dripped into the receiver of 74 g (0.25 mol) trimethylpropanetriacrylate, dissolved in 250 ml ethyl acetate. With cooling, 15.8 g of an ethanolic KOH solution is slowly dripped in. After about 5 minutes the reaction (thiol addition to an acrylate double bond) is terminated. 4.5 g of 0.7 n HCL is dripped in to hydrolyse and condense the methoxy groups. After stirring at ambient temperature for about 1 day, the mixture is processed. The resultant varnish can be used, directly or after modification of the solvent content or composition, to adjust the rheology for wire coating. The following properties result on a Cu wire with a diameter=0.95 mm:

coating thickness: about 8 μm tan δ-glass transition temperature (DIN): about 215° C.

scraping force: about 17 N

Example 5

SR-368: MPMDM=1:1.2

64.9 g (0.36 mol) of 3-mercaptopropylmethyldimethoxysilane are dripped into the receiver of 127 g (0.3 mol) tris-(2-hydroxyethyl) isocyanuratetriacrylate, dissolved in 360 ml ethyl acetate. With cooling, 22.8 g of an ethanolic KOH solution is slowly dripped in. After about 5 minutes the reaction (thiol addition to an acrylate double bond) is terminated. 10.4 g of 0.5 n HCL is dripped in to hydrolyse and condense the methoxy groups. After stirring at ambient temperature for about 1 day, the mixture is processed. The resultant varnish can be used, directly or after modification of the solvent content or composition, to adjust the rheology for wire coating. The following properties result on a Cu wire with a diameter= 0.95 mm:

coating thickness: about 9 μm tan δ-glass transition temperature (DIN) about 205° C.

scraping force about 15 N

1×D–winding curl=crack-free windable

Example 6

SR-368: MPMDM=1:1.2 (with filler)

64.9 g (0.36 mol) of 3-mercaptopropylmethyldimethoxysilane are dripped into the receiver of 127 g (0.3 mol) tris-(2-hydroxyethyl) isocyanuratetriacrylate, dissolved in 360 ml ethyl acetate. With cooling, 22.8 g of an ethanolic KOH solution is slowly dripped in. After about 5 minutes the reaction (thiol addition to an acrylate double bond) is terminated. 10.4 g of 0.5 n HCL is dripped in to hydrolyse and condense the methoxy groups. After stirring at ambient temperature for about 1 day, the mixture is processed, and 20% by weight of microfine glass GM 32087 (silanised) is added. The resultant varnish can be used, directly or after modification of the solvent content or composition, to adjust the rheology for wire coating. The following properties result on a Cu wire with a diameter=0.95 mm:

coating thickness: about 9 μm
tan δ-glass transition temperature. (DIN) about 206° C.
scraping force about 17.5 N
1×D–winding curl=crack-free
windable

Example 7

SR-368: MMDO=1:1

72.1 g (0.36 mol) of mercaptopropylmethyldimethoxysilane are dripped into the receiver of 169 g (0.4 mol) tris-(2-hydroxyethyl) isocyanuratetriacrylate, dissolved in 400 ml ethyl acetate. With cooling, 25.3 of an ethanolic KOH solution is slowly dripped in. After about 5 minutes the reaction (thiol addition to an acrylate double bond) is terminated. 11.5 g of 0.5 n HCL is dripped in to hydrolyse and condense the methoxy groups. After stirring at ambient temperature for about 1 day, the mixture is processed. The resultant varnish can be used, directly or after modification of the solvent content or composition, to adjust the rheology for wire coating. The following properties result on a Cu wire with a diameter=0.95 mnm:

coating thickness: about 11 μm
tan δ-glass transition temperature. (DIN) about 205° C.
scraping force about 23 N

II EXAMPLES OF THE USE OF VARIOUS ORMOCER SYSTEMS AS A FULL COAT

There were used copper wires (Ø=0.32 mm) without a Teic-polyesterimide basic layer. The following coated varnish systems were thus applied as a coat and thermally hardened. At e.g. 370° C. wire speeds in dependence on the furnace length of well above 14 m/min are possible. There result coatings with excellent surface quality. An extremely good bond with the wire surface, i.e. excellent adhesion is observed. Further detailed data are quoted in the individual examples.

Example 8

SR-368: MPMDM:TEOS=1:1:0.4

27.0 g (0.15 mol) of 3-mercaptopropylmethyldimethoxysilane are dripped into the receiver of 63.5 g (0.15 mol) tris-(2-hydroxyethyl) isocyanuratetriacrylate, dissolved in 150 ml ethyl acetate. With cooling, 9.7 g of an ethanolic KOH solution is slowly dripped in. After about 5 minutes the reaction (thiol addition to an acrylate double bond) is terminated. 4.4 g of 0.5 n HCL is dripped in to hydrolyse and condense the methoxy groups. After stirring at ambient temperature for about 5 hours, 12.5 g (0.06 mol) of tetraethoxysilane and 3.5 g of 0.12 n HCL are added. After further stirring at ambient temperature for about 1 day, the mixture is processed. The resultant varnish can be used, directly or after modification of the solvent content or composition, to adjust the rheology for wire coating. The following properties result:

coating thickness: about 10 μm
1×D–winding curl crack-free
windable

Example 9

SR-368: MPMDM:TEOS=1:1:0.5

90 g (0.5 mol) of 3-mercaptopropylmethyldimethoxysilane are dripped into the receiver of 212 g (0.5 mol) tris-(2-hydroxyethyl) isocyanuratetriacrylate, dissolved in 500 ml ethyl acetate. With cooling, 32.2 g of an ethanolic KOH solution is slowly dripped in. After about 5 minutes the reaction (thiol addition to an acrylate double bond) is terminated. 14.7 g of 0.5 n HCL is dripped in to hydrolyse and condense the methoxy groups. After stirring at ambient temperature for about 5 hours, 52 g (0.25 mol) of tetraethoxysilane and 14.8 g of 0.12 n HCL are added. After further stirring at ambient temperature for about 1 day, the mixture is processed. The resultant varnish can be used, directly or after modification of the solvent content or composition, to adjust the rheology for wire coating. The following properties result:

coating thickness: about 10 μm
1×D–winding curl=crack-free
windable

Example 10

SR-368: MPMDM:TEOS:DDDM=1:1:0.4:0.3
(solvent-free application)

90 g (0.5 mol) of 3-mercaptopropylmethyldimethoxysilane are dripped into the receiver of 212 g (0.5 mol) tris-(2-hydroxyethyl) isocyanuratetriacrylate, dissolved in 500 ml ethyl acetate. With cooling, 32.2 of an ethanolic KOH solution is slowly dripped in. After about 5 minutes the reaction (thiol addition to an acrylate double bond) is terminated. 14.7 g of 0.5 n HCL is dripped in to hydrolyse and condense the methoxy groups. After stirring at ambient temperature for about 5 hours, 52 g (0.25 mol) of tetraethoxysilane and 14.8 g of 0.12 n HCL are added. After further stirring at ambient temperature for about 1 day, the mixture is processed, 3.2 g (0.15 mol) dodecandioldimethacrylate are added and the solvent withdrawn by means of a rotary evaporator. The resultant varnish can be used directly for wire coating.

Example 11

SR-368: MPMDM:TEOS=1:1:0.5

13 g (0.072 mol) of 3-mercaptopropylmethyldimethoxysilane are dripped into the receiver of 30.5 g g (0.072 mol) tris-(2-hydroxyethyl) isocyanuratetriacrylate, dissolved in 70 ml ethyl acetate. With cooling, 4.6 g of an ethanolic KOH solution is slowly dripped in. After about 5 minutes the reaction (thiol addition to an acrylate double bond) is terminated. 14.7 g of 0.5 n HCL is dripped in to hydrolyse and condense the methoxy groups. After stirring at ambient temperature for about 5 hours, 7.0 g (0.036 mol) of tetraethoxysilane and 2.14 g of 0.12 n HCL are added. After further stirring at ambient temperature for about 1 day, the mixture is processed. The resultant varnish can be used, directly or after modification of the solvent content or composition, to adjust the rheology for wire coating. The following properties result:

coating thickness: about 9 μm
1×D–winding curl=crack-free
scraping force >8 N
windable Example 12

SR-368: MPMDM:TEOS=1:1:1:0.5

21.6 g (0.120 mol) of 3-mercaptopropylmethyldimethoxysilane are dripped into the receiver of 56.3 g (0.133 mol) tris-(2-hydroxyethyl) isocyanuratetriacrylate, dissolved in 100 ml ethyl acetate. With cooling, 7.9 g of an ethanolic KOH solution is slowly dripped in. After about 5 minutes the reaction (thiol addition to an acrylate double bond) is terminated. 3.53 g of 0.5 n HCL is dripped in to hydrolyse and condense the methoxy groups. After stirring at ambient temperature for about 5 hours, 12.5 g (0.06 mol) of tetraethoxysilane and 3.52 g of 0.12 n HCL are added. After further stirring at ambient temperature for about 1 day, the mixture is processed. The resultant varnish can be used, directly or after modification of the solvent content or composition, to adjust the rheology for wire coating. The following properties result:

coating thickness: about 9 μm
1×D–winding curl=crack-free
windable

What is claimed is:

1. A varnished metal coil wire with one or more electrically insulating varnish coatings, wherein at least one of the electrically insulating varnish coatings comprises an organically modified silicic acid (hetero) polycondensate, which has been obtained by partial or total hydrolytic condensation of at least one of (a) one or more hydrolytically condensable compounds of silicon or of silicon and of elements selected from the group consisting of B, Al, P, Sn, Pb, transition metals, lanthanides and actinides; and (b) one or more precondensates derived from the compounds mentioned under (a);

by the action of water or moisture, the varnish coatings remaining crack-free when the varnished metal coil wire is wound on a core having a diameter equal to the metal wire.

2. The varnished metal wire according to claim 1, wherein the hydrolytic condensation takes place in the presence of at least one of a catalyst and a solvent.

3. The varnished metal wire according to claim 1, wherein the organically modified silicic acid (hetero) polycondensate comprises one or more hydrolytically condensed or precondensed compounds of silicon, which are derived from monomers of the general formula I,

$$\{X_aR_bSi[(R'A)_c]_{(4-a-b)}\}_xB \qquad (I)$$

in which the residues and indices are identical or different and have the following meaning:

A=O, S, PR", POR", NHC(O)O or NHC (O) NR",

B=a straight-chained or branched organic residue, derived from a compound B' with at least one (for c=1 and A=NHC(O)O or NHC (O)NR") or at least two C=C-double bonds and 5 to 50 carbon atoms, R=alkyl, alkenyl, aryl, alkylaryl or arylalkyl,
R'=alkylene, arylene or alkylenearylene,
R"=hydrogen, alkyl or aryl,
X=hydrogen, halogen, hydroxy, alkoxy, acyloxy, alkylcarbonyl, alkoxycarbonyl or NR"$_2$, a=1, 2 or 3
b=0, 1 or 2
c=0 or 1,
x=a whole number, whose maximum value is equal to the number of double bonds in the compound B' minus 1, or is equal to the number of double bonds in the compound B' if c=1 and A is NHC(O) or NHC(O)NR", the alkyl or alkenyl residues being substituted or non-substituted straight-chained, branched or cyclic residues with 1 to 20 carbon atoms aryl being substituted or non-substituted phenyl, naphthyl or biphenyl, and the above alkoxy, acyloxy, alkylcarbonyl, alkoxycarbonyl, alkylaryl, arylalkyl, arylene, alkylene and alkylenearyl residues being derived from the above-defined alkyl and aryl residues.

4. The varnished metal wire according to claim 3, wherein the alkyl or alkenyl residues comprise at least one of the oxygen atoms, sulphur atoms and amino groups.

5. The varnish metal wire according to claim 1, wherein the organically modified silicic acid (hetero) polycondensate comprises one or more hydrolytically condensed or precondensed compounds or silicon, which are derived from monomers of the general formula II,

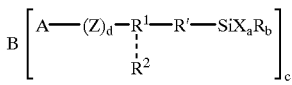

$$B\left[A-(Z)_d-R^1-R'-SiX_aR_b\right]_c$$
         $$\phantom{B[A-(Z)_d-}R^2$$

(II)

in which the residues and indices are identical or different and have the following meaning:

B=a straight-chained or branched organic residue with at least one C=C-double bond and 4 to 50 carbon atoms;

X=hydrogen, halogen, hydroxy, alkoxy, acyloxy, alkylcarbonyl, alkoxycarbonyl or NR"$_2$;

R=alkyl, alkenyl, aryl, alkylaryl or arylalkyl;

R'=alkylene, arylene, arylenealkylene or alkylenearylene with 0 to 10 carbon atoms respectively;

R"=hydrogen, alkyl or aryl;

A=O, S, or NH for
  d=1 and
  Z=CO and
  R$^1$=alkylene, arylene or alkylenearylene with 1 to 10 carbon atoms respectively, and
  R$^2$=H or COOH; or A=O, S, NH or COO for
  d=0 or 1 and
  Z=CHR, with R=H, alkyl, aryl or alkylaryl, and
  R$^1$=alkylene, arylene or alkylenearylene with 1 to 10 carbon atoms respectively, and
  R$^2$=OH; or A=S for
  d=1 and
  Z=CO and
  R$^1$=N and
  R$^2$=H;

a=1, 2 or 3;
b=0, 1 or 2, with a+b=3;
c=1, 2, 3 or 4.

6. The varnished metal wire according to claim 5, wherein the residue R' comprises at least one of the oxygen atoms, sulphur atoms and amino groups.

7. The varnished metal wire according to claim 5, wherein the residue R' comprises at least one of oxygen atoms, sulphur atoms and amino groups if $R^1$ is aklylene, arylene or alkylenearylene.

8. The varnished metal wire according to claim 1, wherein the organically modified silicid acid (hetero) polycondensate comprises one or more hydrolytically condensed or precondensed compounds of silicon, which are derived from monomers of the general formula III,

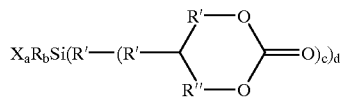  III in which the residues and indices are identical or different and have the following meaning:
X=hydrogen, halogen, hydroxy, alkoxy, acyloxy, alkylcarbonyl, alkoxycarbonyl or $NR^2_2$;
R=alkyl, alkenyl, aryl, alkylaryl or arylalkyl;
R'=alkylene, arylene, arylenealkylene or alkylenearylene with 0 to 10 carbon atoms respectively;
R"=alkylene, arylene, arylenealkylene or alkylenearylene with 1 to 10 carbon atoms respectively;
$R^2$=hydrogen, alkyl or aryl;
a=1, 2 or 3;
b=0, 1 or 2, with a+b=1, 2, or 3;
c=1, 2, 3, 4, 5 or 6;
d=4−a−b.

9. The varnished metal wire according to claim 8, wherein the residue R' comprises at least one of oxygen atoms, sulphur atoms and amino groups.

10. The varnished metal wire according to claim 8, wherein the residue R" comprises at least one of oxygen atoms, sulphur atoms and amino groups.

11. The varnished metal wire according to claim 1, wherein the varnished metal wire comprises at least two varnish coatings, containing an organically modified silicic acid (hetero) polycondensate.

12. The varnished metal wire according to claim 1, wherein the metal wire comprises a metal selected from the group consisting of copper, gold, silver, aluminum, tin, zinc and iron or an alloy of these metals.

13. The varnished metal wires according to claim 1, wherein the metal wire comprises one or more varnish layers on at least one of a Teic-polyesterimide basis, a polyimide basis, a polyamide basis and a polyimidoamide basis.

14. The varnished metal wire according to claim 1, wherein the one or more silicic acid (hetero) polycondensate coatings have a thickness between 1 and 100 μm.

15. The varnished metal wire according to claim 1, wherein the one or more silicid acid (hetero) polycondensate coatings have a thickness between 5 and 30μm.

16. The varnished metal wire according to claim 1, comprising of one or more coatings of other materials or mixtures of other materials than silicid acid (hetero) polycondensates.

17. A coil comprising the varnished metal wire according to claim 1.

18. A winding comprising the varnished metal wire according to claim 1.

19. The varnished metal coil wire of claim 1 wherein the varnish coating has a tan δ-glass transition temperature of at least about 200° C.

20. The varnished metal coil wire of claim 1 wherein the varnish coating has an abrasion resistance measured by scraping force of at least about 8 N.

* * * * *